C. W. DUER.
POWER APPLICATION MECHANISM FOR MOTOR VEHICLES.
APPLICATION FILED MAR. 13, 1918.

Patented Apr. 15, 1919.
3 SHEETS—SHEET 3.

Witnesses:
Arthur W. Carlson
Robert F. Treis

Inventor
Charles W. Duer
Benjamin, Roodhouse & Lundy
Attys.

UNITED STATES PATENT OFFICE.

CHARLES W. DUER, OF CHICAGO, ILLINOIS.

POWER-APPLICATION MECHANISM FOR MOTOR-VEHICLES.

1,300,359.           Specification of Letters Patent.     Patented Apr. 15, 1919.

Application filed March 13, 1918. Serial No. 222,134.

*To all whom it may concern:*

Be it known that I, CHARLES W. DUER, a citizen of the United States, and a resident of the city of Chicago, in the county of Cook and State of Illinois, have invented certain new and useful Improvements in Power-Application Mechanism for Motor-Vehicles, of which the following is a specification.

My present invention has relation to improvements in power application mechanism for motor vehicles, and has special applicability to, and relation to, the construction of axles for heavy motor vehicles adapted to handle heavy loads, although the construction hereinafter described and illustrated will have numerous advantages when applied to pleasure vehicles and all motor vehicles, whether of light or heavy construction.

The special objects of my invention are the provision of suitable instrumentalities for mounting the drive wheels in connection with the chassis and connecting the drive wheels with the source of power, so that a maximum amount of weight of the structure may be carried upon springs, which will both project the vehicle and the mechanism from the hammerlike impacts received in ordinary road traffic when the weight, or at least a large portion thereof, is not suspended upon springs. In the attainment of this main object, as will be hereinafter perceived, I have arrived at divers features of mechanical construction and arrangement of parts which materially improve and enhance the strength of the vehicle and simplify and economize in the manufacture of the structure, its convenient assembly and adjustment, and in the ready replacement of parts when that shall be necessary.

I prefer to attain the above objects in substantially the following manner, reference being now had to the accompanying drawings forming a part of this specification, in which,—

Figure 1:
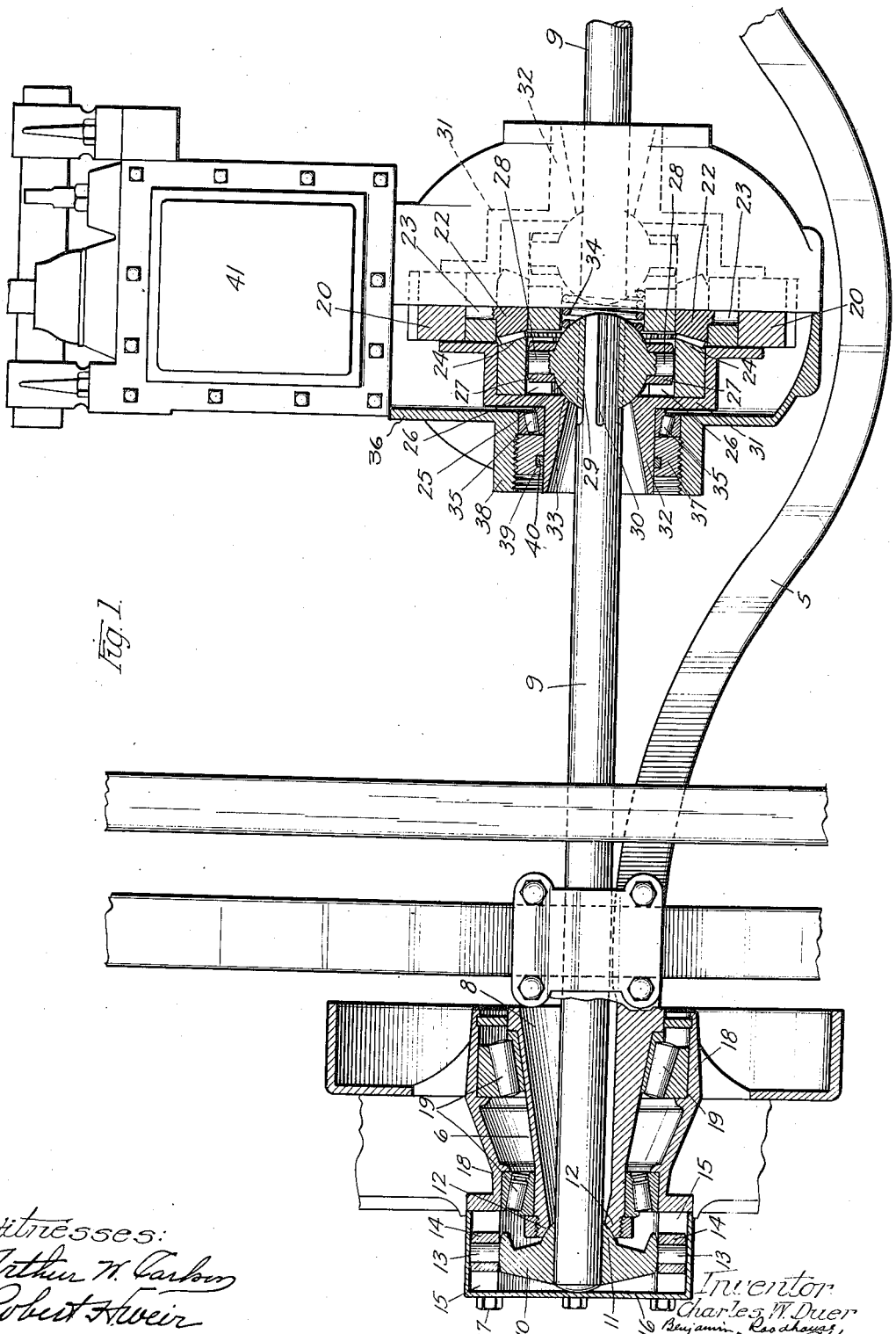
Figure 1 is a fragmental plan, partially in section, showing a portion of a rear axle, the spring suspension means provided thereon, the method of assembly of a driving-wheel therewith, a differential, and the instrumentalities for connecting the differential with the drive-wheel.
Figure 2:
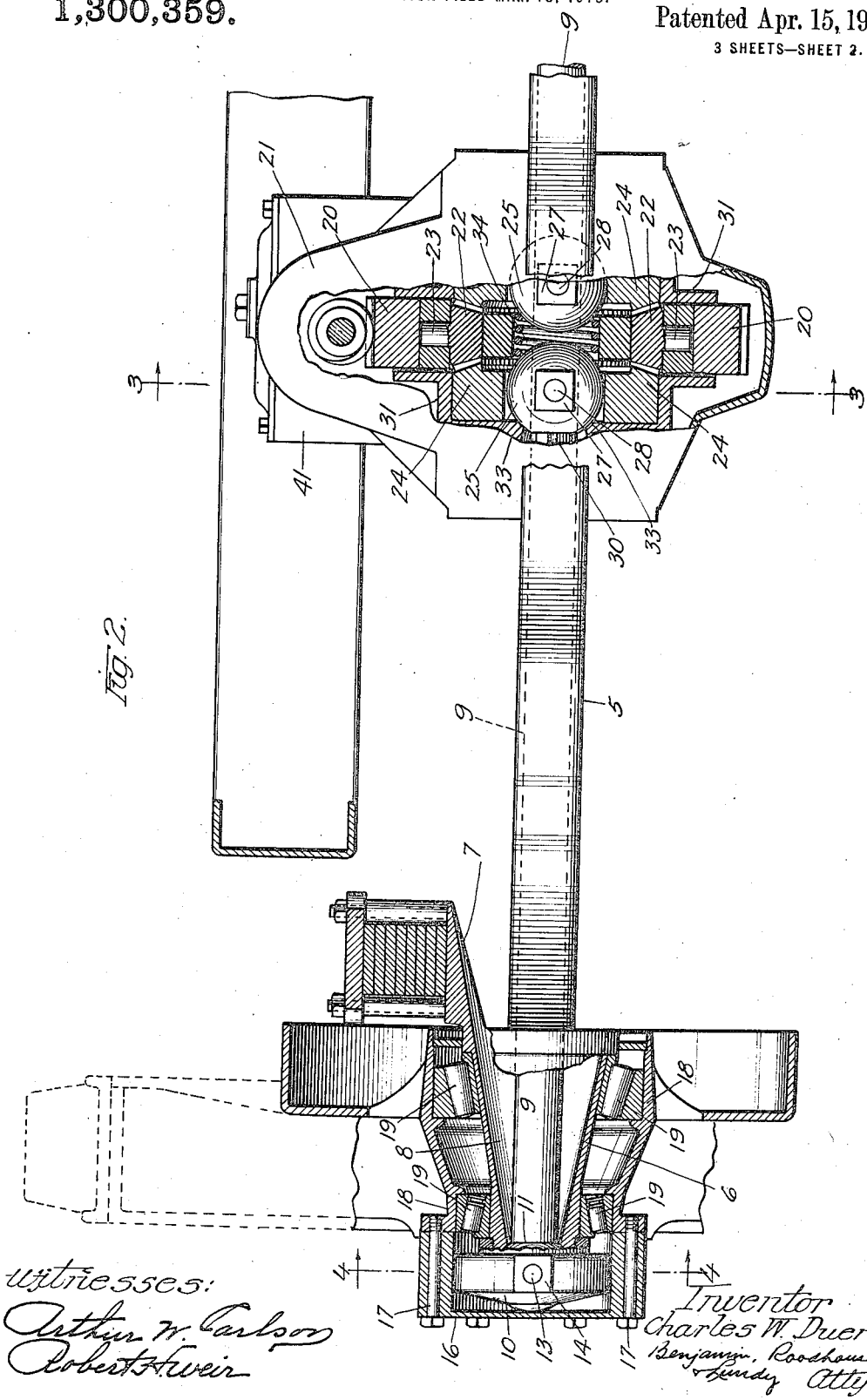
Fig. 2 is a rear elevation of the structure shown in Fig. 1, also partially in central section.

Referring to the drawings wherein similar reference characters are employed to designate the same parts throughout the divers figures, the axle which connects and carries the wheels is designated by the numeral 5. This axle is preferably curved or bowed rearwardly at its central portion in order to permit of the suspension of the differential in a horizontal line between the rear wheels. The ends of the axle are formed into substantially conical enlargements 6, for mounting the wheels, and these conical enlargements are extended inwardly above the axle to provide integral spring platforms 7. The conical enlargements 6 are hollowed out, as shown at 8, to permit of the swinging of the power shaft 9 from its connection at its outer end with the wheel.

Figure 4:
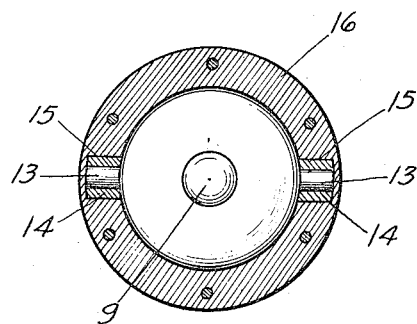
Fig. 4 is a transverse section through the hub, on line 4—4, Fig. 2.

The connection of the outer end of the power shaft 9 with the wheel comprises a disk-shaped member 10, which is centrally bored and secured to the end of the power shaft 9. The inner portion of the disk-shaped member 10 is provided with a central spherical extension or boss 11, which fits into a spherical depression 12 in the outer end of the conical-shaped member 6 upon the end of the axle. Extending from diametrically opposite points upon the disk-shaped member 10, are trunnions or stub shafts 13, which are journaled in angular bearing blocks 14. These blocks set into and are adapted to move in transverse slots or seats 15, in a hub-cap 16, clearly shown in Figs. 1 and 4 of the drawings, which is secured by means of the bolts 17 to the cast hub 18 of the drive wheel. Suitable anti-frictional bearings 19 are preferably interposed between the outer surface of the conical ends 6 of the axle and the inner surface of the hub 18 of the wheel. The periphery of the disk-shaped member 10 and the ends of the trunnions 13, as well as the outer faces of the rectangular bearing blocks 14 are given a sufficiently arc-shape to permit sufficient movement thereof as the inner end of the power shaft 9 may be moved.

The differential may be of the usual type and preferably comprises the driven annular worm-gear 20, which derives its motion from worm pinion 21 and carries the beveled pinions 22, extending radially from the interior thereof, on stubs 23. The gears 24, which mesh with the pinions 22, are centrally bored to accommodate the balls 25 of the universal joints, which secure the driven gears respectively to the drive-shafts 9. The driven gears 24 are also provided with channels 26, similar to the channels 15 in the hub-caps, in which are seated rectangular bearing blocks 27, centrally bored as journals for trunnions or stub shafts 28, extending from diametrically opposite points of the balls 25.

Figure 3:
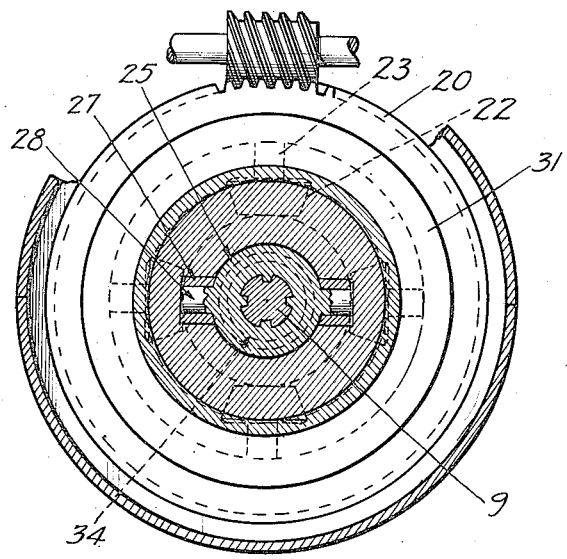
Fig. 3 is a transverse section through the differential, on line 3—3, of Fig. 2.

The balls 25 are centrally bored transversely of the axis of the shaft 28 to receive the inner ends of the drive-shafts 9, and to prevent relative rotary movement between the shafts 9 and the balls 25, suitable means are provided, preferably splines 29 and splineways 30, as shown in Figs. 1 and 3, which will permit of the power shafts 9 being withdrawn from and assembled with the differential without a disassembly of the differential itself, and also will allow of the sliding of the power shaft, as the relation between the differential and the wheels is changed through the action of the springs.

The driven gears 24 are held in assembly with the pinions 22, by means of the annular frames 31, which are positioned upon the respective sides of the worm gear 20. The central portions of the frames 31 are extended to provide tubular embossments 32, the inside diameters of which increase toward their outer ends. The central portions of the frames 31 adjacent the tubular extensions, are given a spherical form at 33 to provide seats and bearings for the balls 25 of the universal joints, and the balls for the opposite shafts are kept pressed against their respective seats by the helical expansion spring 34 interposed between said balls. Suitable anti-frictional bearings 35 are interposed between the tubular extensions of the frames 31, and the differential housing 36, and these bearings are held in position by the exteriorly threaded rings 37 which screw into the interiorly threaded embossment 38 of the differential housing that surrounds the tubular portions 32 of the frames. Annular channels 39 are preferably provided in the rings 37, in each of which may be mounted a dust-washer 40 to exclude dust from the interior of the differential.

It will now be seen that both ends of each power-shaft 9 are mounted so as to permit of a certain considerable latitude of movement, which permits of the attachment of the heavy differential mechanism to the spring-suspended chassis of the vehicle. Heretofore the principal objection to combining the transmission with the differential lay in the weight which was added to the portion of the vehicle which was not suspended upon springs. With my construction, the differential now being spring-suspended, the transmission construction may be conveniently assembled therewith, as shown at 41 in Fig. 1, without any disadvantages whatever. It will also be seen that the assembly of the ends of the shafts 9 respectively with the differential and with the wheels are so inclosed as to be protected from injury and dirt, and also that the power-shafts 9 may be easily removed or replaced by the removal of the hub-caps 16, without disturbing the adjustments of either the differential or the wheels.

While I have illustrated and described herein certain specific instrumentalities for carrying out my invention, it will be quite obvious to others skilled in this art, that divers modifications, refinements and changes may be made thereto without materially departing from the principles involved. I desire it understood that I do not limit myself to the particular embodiment of the invention illustrated and described herein.

What I claim as new is:—

1. Mechanism of the kind specified comprising an axle having its opposite ends provided with substantially hollow conical extensions, wheels journaled on said extensions, drive-shafts having their outer ends extended through the hollow portions of said conical extensions and pivotally connected to said wheels, a differential mechanism, universal joints carried thereby and longitudinally sliding connections between said universal joints and the inner ends of said drive-shafts whereby the inner ends of said drive-shafts are capable of vertical movement with said differential mechanism and such movement is accommodated in the hollow portions of said axle extensions.

2. Mechanism of the kind specified comprising an axle having its opposite ends provided with hollow substantially conical extensions, wheels journaled on said extensions, drive-shafts having their outer ends extended through the hollow portions of said conical extensions and pivotally connected to said wheels, a differential mechanism, and universal joints connecting the inner ends of said drive-shafts and said differential mechanism whereby the inner ends of said drive-shafts are capable of vertical movement with said differential mechanism and such movement is accommodated in the hollow portions of said axle extensions.

3. Mechanism of the kind specified comprising an axle having its opposite ends provided with hollow substantially conical extensions, wheels journaled on said extensions, drive-shafts having their outer ends extended through the hollow portions of said conical extensions, a differential mechanism, and universal joints connecting the ends of said shafts with their respective wheels and said differential mechanism whereby the inner ends of said drive-shafts are capable of vertical movement with said differential mechanism and such movement is accommodated in the hollow portions of said axle extensions.

4. Mechanism of the kind specified comprising an axle having its opposite ends provided with hollow substantially conical extensions, wheels journaled on said extensions, drive-shafts having their outer ends extended through the hollow portions of said conical extensions, a differential mechanism, universal joints connecting the ends of said shafts with their respective wheels and with said differential mechanism, and means providing a sliding engagement between each of said shafts and one of its respective universal joints whereby the inner ends of said drive-shafts are capable of vertical movement with said differential mechanism and such movement is accommodated in the hollow portions of said axle extensions.

5. Mechanism of the kind specified comprising an axle having its opposite ends provided with suitable extensions, wheels journaled on said extensions, universal joints carried by said wheels, drive-shafts having their outer ends extended through said extensions and connected to their respective universal joints, a differential mechanism, and means providing a sliding engagement between the inner ends of said shafts and their respective universal joints in the differential mechanism whereby the inner ends of said drive-shafts are capable of vertical movement with said differential mechanism and such movement is accommodated in the hollow portions of said axle extensions.

6. Mechanism of the kind specified comprising an axle provided with suitable extensions at its ends, wheels journaled on said extensions, a differential mechanism, drive-shafts extending from said differential mechanism through said extensions to said wheels, and means providing universal connections between said shafts and said wheels and differential mechanism including devices that permit of a sliding connection between said shafts and said differential mechanism whereby the inner ends of said drive-shafts are capable of vertical movement with said differential mechanism and such movement is accommodated in the hollow portions of said axle extensions.

7. In mechanism of the kind specified a differential comprising an annular driven gear, radially disposed pinions carried thereby, gears meshing with said pinions said last-mentioned gears being centrally bored and transversely slotted, angular bearing-blocks mounted in said slots, balls, trunnions carried by said balls and journaled in said bearing-blocks, frames inclosing said gears and having spherical seats for said balls, means for yieldingly holding said balls in their respective seats, a differential housing, anti-frictional bearings interposed between said housing and said frames, and drive-shafts having splined connections with said respective balls.

8. In mechanism of the kind specified, an axle having its opposite ends provided with hollow substantially conical extensions that have substantially spherical depressions in their ends, wheels journaled on said extensions, drive-shafts, members carried thereby having spherical embossments mounted in said spherical depressions, oppositely extending trunnions carried by said members, angular bearing-blocks in which said trunnions are journaled, hub-caps having transverse channels adapted to receive said angular bearing-blocks, and means for securing said hub-caps to said wheels.

9. In mechanism of the kind specified, a differential comprising an annular driven gear, radially disposed pinions carried thereby, gears meshing with said pinions said last-mentioned gears being centrally bored and transversely slotted, angular bearing-blocks mounted in said slots, balls, trunnions carried by said balls and journaled in said bearing-blocks, frames inclosing said gears and having spherical seats for said balls, and drive-shaft having splined connections with said respective balls.

10. In mechanism of the kind specified, a differential comprising an annular driven gear, radially disposed pinions carried thereby, gears meshing with said pinions said last-mentioned gears being centrally bored and transversely slotted, angular bearing-blocks mounted in said slots, balls, trunnions carried by said balls and journaled in said bearing-blocks, frames inclosing said gears and having spherical seats for said balls, means for yieldingly holding said balls in their respective seats, and drive-shafts having splined connections with said respective balls.

11. In mechanism of the kind specified, a differential comprising an annular driven gear, radially disposed pinions carried thereby, gears meshing with said pinions said last-mentioned gears being centrally bored and transversely slotted, angular bearing-blocks mounted in said slots, balls, trunnions carried by said balls and journaled in said bearing-blocks, frames inclosing said gears and having seats for said balls, means for yieldingly holding said balls in their respective seats, and drive-shafts having splined connections with said respective balls.

12. In mechanism of the kind specified, a differential comprising an annular driven wheel, radially disposed pinions carried thereby, gears meshing with said pinions, a universal joint mounted in each of said last-mentioned gears, drive-shafts connected to each of said universal joints and a differential housing surrounding and inclosing the aforementioned elements provided with openings through which said shafts extend and have movement independently of said other elements.

13. In mechanism of the kind specified, a differential comprising the primary gear, the intermediate and the driven gears, universal joints carried by said driven gears, and means for securing connections of the power-shafts thereto whereby said shafts are adapted to be rotated and have lateral motion independently of said elements.

Signed at Chicago, county of Cook, and State of Illinois, this 2nd day of March, 1918.

CHARLES W. DUER.

Witnesses:
 BENJ. T. ROODHOUSE,
 H. SLACK.